United States Patent [19]

Potter et al.

[11] Patent Number: 4,631,365
[45] Date of Patent: Dec. 23, 1986

[54] INTERCOM SYSTEM

[76] Inventors: Clinton Potter, 1012 Aloha Dr., Encinitas, Calif. 92024; Robert Hasty, 1882 Burton St., San Diego, Calif. 92111

[21] Appl. No.: 653,284

[22] Filed: Sep. 24, 1984

[51] Int. Cl.$^4$ .............................................. H04M 9/00
[52] U.S. Cl. ...................................... 379/167; 379/56
[58] Field of Search .................. 179/37, 81 B, 100 L, 179/2 E, 2 EA; 455/74, 78

[56] References Cited

U.S. PATENT DOCUMENTS

| | | | |
|---|---|---|---|
| 3,453,390 | 7/1969 | Durkee et al. | 179/37 |
| 3,849,603 | 11/1974 | Proios | 179/37 |
| 4,006,310 | 2/1977 | Bayer | 179/37 |
| 4,172,967 | 10/1979 | Porter et al. | 179/81 B |
| 4,427,847 | 1/1984 | Hofmann et al. | 179/100 L X |
| 4,554,411 | 11/1985 | Armstrong | 179/37 |

FOREIGN PATENT DOCUMENTS 2098832 11/1982 United Kingdom .................. 455/74

Primary Examiner—Keith E. George
Attorney, Agent, or Firm—Frank D. Gilliam

[57] ABSTRACT

The invention is directed to an intercom system for communication between persons on opposite sides of an entry door or the like. On a first embodiment the intercom device is energized by the person on the exterior of the door when a combined power and door buzzer or bell switch is depressed. When energized, voice communication can be established by the combined speaker, microphone and amplifying devices. A sound activated switch positioned on the interior side of the entry door allows hands free communication between the persons on the opposite sides of the door. A timer terminates the system power after a predetermined time span. In a second embodiment, a pair of radio frequency transceivers are employed with the intercom device to allow communication by the person on the interior side of the door who is located remote from the door.

2 Claims, 3 Drawing Figures

INTERCOM SYSTEM

BACKGROUND OF THE INVENTION

This invention relates to a communication system for allowing a person on the interior side of an entry door or the like to communicate with a person on the outside thereof without the opening of the door.

Conventional known means of communication between people on the inside and outside of an entry door include small openings or peep holes through the door which can be opened and closed by the person on the interior side thereof, video cameras and associated audio systems allowing the person on the interior side of the door to identify the person on the exterior through a television receiver and then communicate through the audio system, intercom systems wherein the external speaker/microphone is located adjacent the door on the exterior and the interior speaker/microphone and controls are located within the kitchen or the like of the interior of the door, etc.

These conventional and known devices have various drawbacks. All of these devices require the person on the interior side of the door to activate the system either by energizing the system or the opening of the peep hole or access door in the entry door at a fixed or pre-determined location. In the case of the video system the person on the interior side of the door must activate the television receiver and camera or if the system is activated at least must turn the receiver to the proper receiving channel, etc. In the case of the location dedicated hard wired intercom system, the person must walk to the central control, activate the system, press the talk switch to the talk position and then release the switch to listen. Other known systems likewise require the person on the interior side of the entry door to activate the system at a location remote from their present location.

Obviously, people that are physically disabled, ill, bed ridden and weak and the like have great difficulty in communicating with people at the exterior side of their doors. Under all circumstances it is a nuisance to have to get up and communicate with unexpected and undesirable people at the entry door.

This invention is intended to eliminate at least some if not all of the inconveniences encountered by the act of a person responding to people on the exterior of an entry door.

SUMMARY OF THE INVENTION

The device of the invention can be inter-connected to the conventional door bell or buzzer energizing button so that when a person on the exterior of the entry door signals the person on the opposite side thereof of his presence simultaneously energizes the intercom system. If the person on the interior side of the door is located in the same general area as the door then that person can communicate with the exterior side thereof by speaking in a normal voice from their existing position. The sound of the voice of that person on the interior side of the door activates an amplifier circuit which switches a combination speaker and microphone on the exterior side of the door to the speaker mode and connects the interior person's voice through the exterior speaker. When the person inside terminates voice communication, the combined exterior speaker/microphone automatically switches to the microphone mode and the person on the exterior of the door can now talk into the combined speaker/microphone and through an amplifier to a speaker on the interior side of the door. The voice of that person located on the interior will always over-ride the voice of the exterior person. A timer, which is also energized by the pressing of the door bell or buzzer button, terminates the power to the system after a pre-determined span of time.

In a second embodiment, a pair of transceiver radio units are incorporated so that the pressing of the door bell or buzzer button also energizes the transceiver radio positioned on or near the intercom system located at the entry door. The audio signal from the door bell, or buzzer or the like signals the person on the interior side of the entry door remote therefrom to energize the second transceiver radio which is available to that person and transmit and receive voice communications thereby in a normal expected manner. The push to take switch or button for the entry door tranceiver is located on the exterior side of the entry door for use by the person on the exterior to talk to the person on the interior side thereof having the second transceiver. The range of distance between the persons communicating is determined by the pair of transceivers selected.

An object of this invention is to enable a person on the interior side of an entry door to effectively communicate with a person located on the exterior side of that entry door without leaving his or her immediate location.

Another object of this invention is to provide a hands-free communication between a person on the interior side of a door and a person on the exterior side of that door.

A further object of this invention is to provide a means for conserving electrical energy utilized to power the device.

A further object of this invention is to provide an intercom system having a self contained power source.

A further object of this invention is to provide a combined means for producing an audible signal and energizing the device.

A still further object of this invention is to provide an inexpensive means for providing communications from the exterior side of an entry door to a person on the interior side of the entry door either adjacent to or remote therefrom.

Other objects and novel features of the invention, which are not specifically mentioned at this time, will be apparent from the following description and appended claims, which when studied in conjunction with the accompanying drawings, which shows the embodiments of the invention in which like parts are designated by like numerals of reference throughout the several views and in which:

DETAILED DESCRIPTION OF THE DRAWINGS

Figure 3:
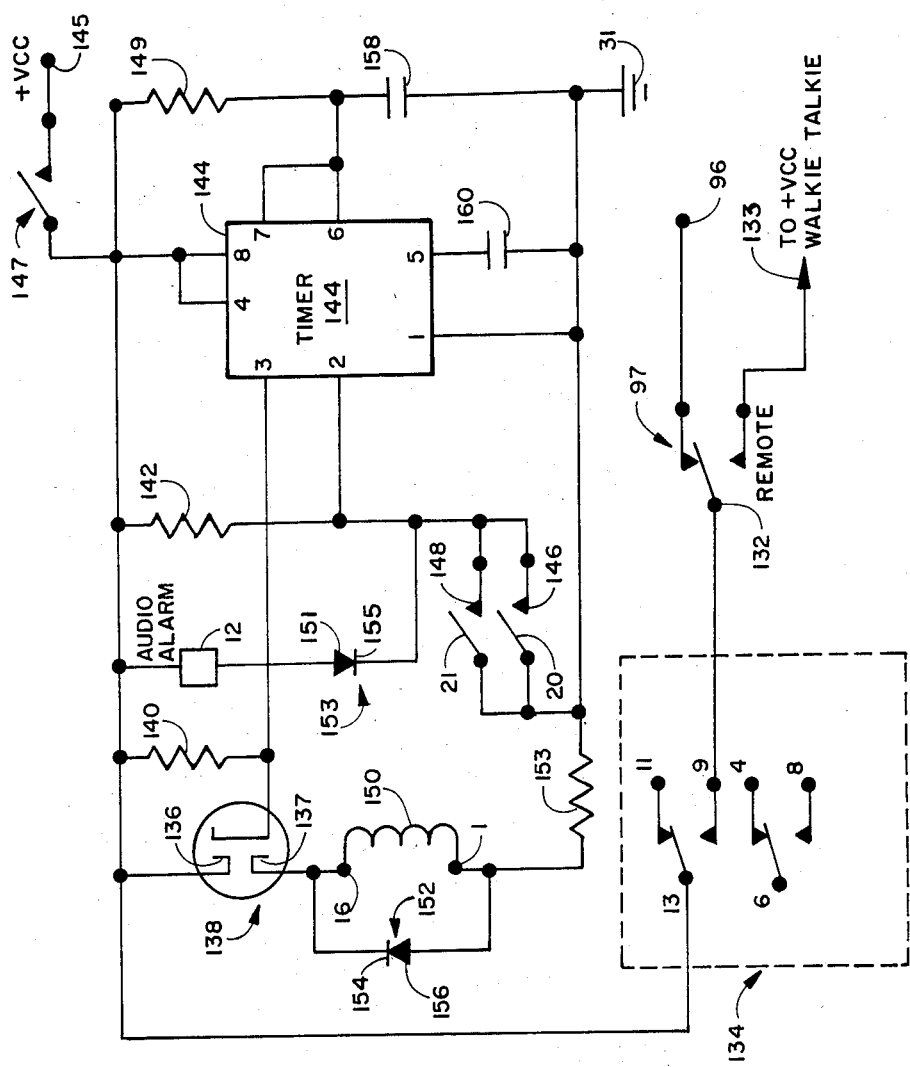
FIG. 3 is a schematic showing of a second portion of the schematic of the invention.
Figure 1:
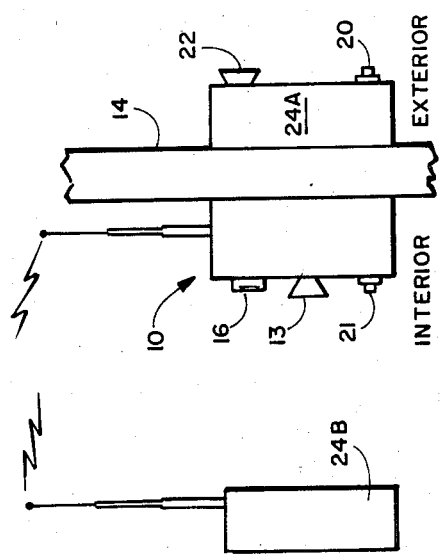
FIG. 1 is a partial side view of a door utilizing the device of the invention.

Referring now to the various figures. The invention 10 is shown mounted on a door or wall panel 14. Normally, the device will be positioned, if not on the door, then in close proximity thereto, for the principal purpose of the invention is to allow communications by persons on opposite sides of the door without the opening thereof. One embodiment of the invention 10 is a means of communicating between persons on either side of a door when both persons are in close proximity thereto. The device comprises a combined speaker/microphone 22 positioned on the exterior side of the door 14 with which the person on the exterior side of the door can both speak into and receive a return audio response from the person on the interior side. In order to alert the person inside when a person is at the door, an audio alarm 12 is sounded by the person on the exterior of the door by the operation of switch 20. This switch turns on both the power to the device 10 and signals the person within the structure, for example by audio means, such as a conventional door bell or buzzer, that someone wishes entry or communications with them. A parallel connected switch 21 for the same purpose as switch 20 is located on the interior of the door so that the system can be energized by the person on the interior side of the door, if desirable. In effect, the button switch 20 is pushed, the person on the interior side of the door is signaled that someone wishes entry or communication. The person on the inside or interior of the door positioned near the door 14 is able to speak into a microphone 16 on the interior side of the door in a hands-free manner and that person's voice operates a relay 52 that connects the outside speaker/microphone 22 to a speaker mode, so that the person on the inside has voice control of the device 10, that is, the speech from the inside person is now transmitted through the door 14 to the exteriorly positioned speaker/microphone 22. During speech from the inside the speaker/microphone 22 remains in a speaker mode until the sound level of the voice of the interior of the door is terminated. When the person on the exterior side of the door speaks into the speaker/microphone 22, in a microphone mode that person's voice passes through an amplifier 40 to the inside speaker 13. Communications between the parties can be maintained in this manner for a time span determined by the operation of timer 106.

If the person on the interior side of the door is physically or otherwise disabled or for some reason unable to move to a position in the vicinity of the interior surface of the door to talk through the device 10 as noted above, a pair of commercially available transceivers 24A and 24B are utilized. The first transceiver 24A is attached to the door 14 and interconnected to the device 10 as hereinafter discussed. In addition, the depressing of switch 20 or 21 now provides D.C. voltage to power the transceiver 24A attached to the door (either interior or exterior). The microphone 26 from the transceiver 24A is available on the exterior of the door for use by the person located on the outside thereof. A transmit/receive push button, typical to transceivers of the type used, is positioned on the exterior side of the door for operation of the transceiver, that is to operate the transceiver 24A between receive and transmit modes. The closing of switch 20 as afore mentioned, alerts the person on the interior side of the door 14 to turn on the second transceiver 24B which they have available. The person on the interior side of the door operates the second transceiver 24B in a normally expected manner, that is, turns on power and depresses the press-to-talk button and talks into the transceiver microphone, which provides a wireless transmission to the receiver portion of transceiver 24A attached to the door. When the communication from the person on the interior side of the door is terminated, then the person on the exterior side of the door can press the push-to-transmit button and transmit back to the transceiver 24B on the interior in a conventional manner. Generally speaking, the first embodiment is a hands free communication system between a person on the exterior side of the door 14 and a person near the interior side of the door and the second embodiment provides a wireless communication between a person within the house but remote from the door, with a person located adjacent the exterior side of the door.

Figure 2:
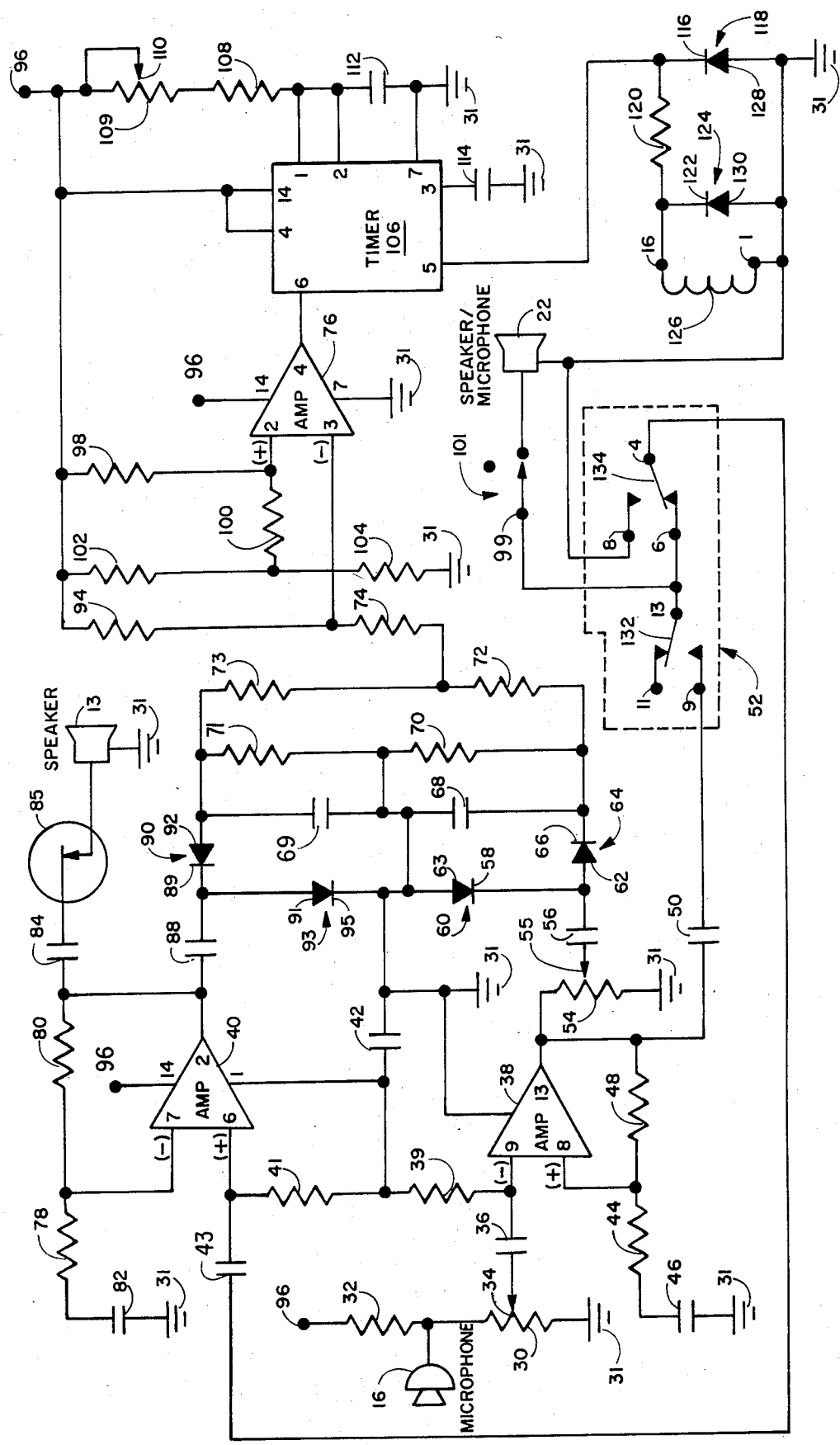
FIG. 2 is a schematic showing of a portion of the circuitry of one embodiment of the invention.

Starting at the left hand center of the schematic showing of FIG. 2, a microphone 16 is connected through a variable resistor 30 of 100 K ohms to ground potential 31. The microphone 16 has a voltage supply provided from a 9 volt D.C. source 145 through local position terminal 96 of local/remote switch 97 through series resistor 32 of 5.6 K ohms. The output of the microphone connects to the wiper 34 of potentiometer 30, through a series 0.1 microfarad capacitor 36 to input 9 of an operational amplifier 38. The microphone output, in addition to being connected to terminal 9 of the operational amplifier 38, is connected through a 100 K ohm resistor 39 to the feedback terminal 1 of a second operational amplifier 40 and through a second 100 K ohm resistor 41 to terminal 6 of operational amplifier 40. Also connected to pin 6 of operational amplifier 40 is a 0.1 microfarad capacitor 43. Connected at the junction between the two 100 K ohm resistors 39 and 41 is a 200 microfarad capacitor is connected to ground potential 31. Pins 3, 4, 5, 10, 11 and 12 of operational amplifier 38 (not shown) are all connected to ground potential 31. Pin 8 of operational amplifier 38 is connected through a 150 ohm resistor 44 and a series 4.7 microfarad capacitor 46 to ground potential 31. Also connected to terminal 8 of operational amplifier 38 is a 150 K ohm resistor 48 connected to the output pin 13 of the operational amplifier 38 and to a 200 microfarad capacitor 50. The opposite side of the 200 microfarad capacitor 50 is connected to contact 9 of voice activated relay 52, hereinafter discussed in greater detail. The output of operational amplifier 38 at pin 13 is also connected through a 10 K ohm potentiometer 54 to ground. The wiper 55 of the potentiometer 54 is connected through a 0.1 microfarad capacitor 56 to the cathode 58 of diode 60 and the anode 62 of diode 64. The anode 63 of diode 60 is connected to ground potential. The cathode 66 of diode 64 is connected in parallel through a 2.2 microfarad capacitor 68 to ground potential, through a 10 K ohm parallel resistor 70 to ground potential, through a 47 K ohm resistor 72 and a 100 K ohm resistor 74 to terminal 3 input of operational amplifier 76.

Referring now to operational amplifier 40. Terminal 7, is connected in parallel between a 150 ohm and a 150 K ohm resistor 78 and 80 respectively. The opposite side of resistor 78 is connected through a 4.7 microfarad capacitor 82 to ground potential 31. The opposite end of resistor 80 takes two parallel paths. One path is connected to terminal 2 of the operational amplifier 40 and provides feedback thereto and the second path passes through a 200 microfarad capacitor 84 to a normally closed jack 85 and to the voice coil of speaker 13. The opposite side of the voice coil is connected to ground potential 31. The output at terminal 2 of the operational amplifier 40 is connected through a 0.1 microfarad capacitor 88 to the cathode 89 of a diode 90 and the anode 91 of diode 93. The anode 92 of the diode 90 is parallel connected to 2.2 microfarad capacitor 69, to ground, to a 10 K ohm resistor 71, to ground a through resistor 73 to resistor 74. The cathode 95 of the diode 93 is connected to ground potential.

Referring now to the circuit of operational amplifier 76. Pin 3 of operational amplifier 76, in addition to being connected to the opposite side of resistor 74, is connected through a one meg ohm resistor 94 to the local position terminal 96 of local/remote switch 97. Similarly, input terminal 2 of operational amplifier 76 is connected through a one meg ohm resistor 98 to local/remote switch terminal 96. Also connected to terminal 2 of operational amplifier 76 is a 100 K ohm resistor 100. The opposite end of resistor 100 is connected through a 15 K ohm resistor 102 to local/remote switch terminal 96. The junction of resistors 100 and 102 is connected through a 220 ohm resistor 104 to ground potential 31. Terminal 14 of the operational amplifiers 40 and 76 is connected to D C voltage source 145 through terminal 96 and terminal 7 of amplifier 76 is connected to ground potential 31. The output of operational amplifier 76, that is, terminal 4, is connected directly to terminal 6 of timer 106. Terminals 4 and 14 of timer 106 are connected to 96 of local/remote switch 97 (see FIG. 3). Terminals 1 and 2 of the timer 106 are interconnected and their common connection is divided into two parallel paths. One path is through a 10 K ohm resistor 108 and a 100 K ohm potentiometer 109 with its wiper 110 wired as a voltage divider to terminal 96 of local/remote switch 97. Also connected to terminals 1 and 2 and terminal 7 of the timer 106 is a 10 microfarad capacitor 112. Terminal 7 is also connected to ground potential. Terminal 3 of the timer 106 is connected through a 0.01 microfarad capacitor 114 to ground potential 31. The values of resistor 108, the setting of potentiometer 110 and the value of capacitor 112 determine the on-time for timer 106.

Referring again to relay 52 of FIG. 2. Terminal 13 of relay 52 takes two separate paths. One path is to terminal 99 of switch 101 which is ganged with local/remote switch 97, so that when switches 97 and 101 are in their local position, as shown in the figures, the voice coil of speaker/microphone 22 is connected to terminal 13 of relay 52. The other path is to terminal 6 of the relay. Terminal 8 of the relay connects to ground potential 31 as is the opposite side of the voice coil of speaker/microphone 22. Terminal 4 of relay 52 is connected to the opposite side of capacitor 43.

Referring again to the timer 106. Terminal 5 is connected to the cathode 116 of a diode 118 and through a 27 ohm resistor 120 to the cathode 122 of diode 124 and to terminal 16 of the relay 52 activating coil 126. The anodes 128 and 130 respectively of diodes 118 and 124 are connected to ground potential 31 as is terminal 1 of the relay activating coil 126. It should be noted at this point that the contacts of relay 52 are shown in their rest position. That is, the switch portion 132 connected to terminal 13 is normally at rest in contact with terminal 11, which has no circuit connection, and also the switch 134 at terminal 4 is normally at rest in a position common with terminal 6. It should be understood that when the relay coil 126 is energized it activates and repositions the switches, the relay 52, and the contact at terminal 13 now becomes connected to the contact 9 and the contact 4 of switch 134 is now in contact with the contact at connector 8.

Referring now to FIG. 3. Terminal 132 of local/remote switch 97 is connected to terminal 9 of a relay 134. Terminals 4, 6, 8, and 11 have no connection. Terminal 13 is connected to the drain 136 of a VMOS FET 138, to a resistor 140 of 3.9 meg ohms, a resistor 142 of 15 K ohms, to terminals 4 and 8 of a timer 144, to resistor 149 of 1 meg ohm, to a 9 volt D.C. power source 145 through on/off switch 147 and to one side of audio alarm 12. The opposite side of resistor 140 is connected to the gate of VMOS FET 138 and terminal 3 of timer 144. The opposite side of resistor 142 is connected to common terminals 146 and 148 of switches 20 and 21 respectively and to terminal 2 of timer 144. The opposite sides of switches 20 and 21 are connected to ground potential 31. The opposite side of the audio alarm 12 is connected to anode 151 of diode 153. The cathode 155 of diode 153 is connected to common terminal 148 of switches 20 and 21. Connected to the source of VMOS FET 138 is the actuating coil 150 of relay 134. A diode 152 is connected across coil 150. The cathode 154 and anode 156 of diode 152 are connected to terminals 16 and 1 respectively of relay 134. Terminal 16 is also connected to the source connecting 137 of FET MOS 138. Terminal 1 of relay 134 is also connected to ground potential 31 through resistor 153 of 27 ohms. The opposite side of resistor 149 is connected to terminals 6 and 7 of timer 144 and to a capacitor 158 of 100 microfarads. The opposite side of capacitor 158 and terminal 1 of timer 144 is connected to ground potential. A capacitor 160 of 0.01 microfarads is connected between terminal 5 of timer 144 and ground potential 31. The value of resistor 149 and capacitor 158 determine the on time of timer 144 and can be selected to provide the desired on time. The values chozen provide approximately one minute of on time.

The power to transceiver 24A is provided from the remote terminal 133 of local/remote switch 97. Transceivers 24A and 24B operate in a normally expected manner.

OPERATION OF THE INVENTION

Switches 97 and 101 are positioned as shown in the Figures and switch 147 is closed. A person exterior of the door 14 depresses the button 20 which sounds the audio alarm 12 and energizes timer 144 supplying 9 volts D.C. at terminal 96. The audio alarm, as aforementioned, may be a door bell or the like. The timer is in an "on" condition for a time duration according to the values of the components 149 and 158. The operation time of the timer 144 should be at least a one minute duration. Hearing the audio alarm, the person on the inside of the door directs speech in a normal voice level toward the door unit 14. The voice level of the speech activates the sound activated relay 52. The activation of the relay switches the outside speaker microphone from a microphone configuration to a speaker configuration and connects the inside microphone 16 through an amplifier to the external speaker/microphone 22. A normal conversation between the parties can be accomplished without the need of the opening of the door. The conversation can continue until the timer 144 terminates its operation and opens the devices power circuit to the 9 volt D.C. power supply. Timer 106 operates as long as the person on the interior continues to talk. If additional time for communications is required, the button 20 or 21 must again be depressed to re-initiate power to the circuit.

In the wireless operation mode the switches 97 and 101 are switched to their "remote" positions. In this position speaker microphone 22 is disconnected from the circuit (physically replaced by transceiver 24A) and 9 volts D.C. from switch 97 is supplied directly to the transceiver 24A. The audio signal from audio alarm 12 is heard by the person within the interior side of the door 14 positioned remote therefrom. This signals that person to turn on the power to the hand held transceiver 24B which they have close by and to operate the transceiver 24B in a normally expected manner, i.e., press the press-to-talk switch and talk into the microphone of the transceiver. The voice is transmitted through the airways and received by transceiver 24A in a conventional manner. To respond, the person on the exterior of the door presses the press-to-talk switch associated with the transceiver 24A and speaks into its microphone. The voice is transmitted from transceiver 24A through the airways and received by transceiver 24B and emitted from its speaker. The communication can be continued back-and-forth in this manner.

The various components are as follows:

PARTS LIST

Timers 106 and 140 are timers manufactured by Segnetics;

Microphone 16—M—1 microphone element manufactured by

Archer Radio Shack—RAD SHK cat. No. 270-090;

Speaker 13—RAD SHK cat. No. 40-245;

Speaker Microphone 22—RAD SHK cat. No. 40-254;

UMOS FET—RAD SHK cat. No. 276-2070;

Relays 52 and 134—RAD SHK cat. No. 275-215, manufactured by ARCHER;

Diodes 60, 61, 62, and 145—Germanium 1N34R or equivalent;

Diodes 118, 124 and 152—Silicon IN4001 or equivalent;

Switch 97 and 101 are a pair of ganged signal pole, single throw switches;

Amplifiers 40 and 38—are sections of a dual power audio amplifier—National Semi-Conductor LM 1877 or equivalent;

Amplifier 76 is a quad amplifier manufactured by National Semi-Conductor model LM 3900 or equivalent; and Transceivers 24A and 24B are micro size walkie-talkies manufactured by Archer—RAD SHK cat. No. 60-4004 or equivalent;

All resistors are ¼ watt unless otherwise noted.

All capacitors are 12 volt D.C. or higher.

Equivalent parts may be interchanged.

Having described the invention and what is considered to be new and is desired to be protected by Letters Patent is set forth in the following claims:

1. An intercom system for communicating between persons through a structure having an interior and exterior side comprising:
    a first transceiver located on the exterior of said structure;
    a second transceiver located on the interior side of said structure and remote therefrom;
    an external source of voltage for operating said first transceiver means;
    a timing means interconnected between said external source of voltage and said first transceiver means for providing said voltage to said first transceiver means for a set time period when activated;
    an activating means manually initiated by a person positioned on said exterior side of said structure for starting the operation of said timing means to activate said first transceiver means;
    an audio alarm energized momentarily by the activating means when said timing means is activated, whereby when the activating means initiates power to said first transceiver means by activating said timing means and sounds said audio alarm a person on said interior side of said structure remote therefrom is alerted to turn on the power to said second transceiver to initiate a conversation via said transceivers.

2. The invention as defined in claim 1 wherein the timing means operates for approximately one minute after being started.

* * * * *